(12) United States Patent
Tang et al.

(10) Patent No.: US 7,620,112 B2
(45) Date of Patent: Nov. 17, 2009

(54) ADAPTIVE BASIS FUNCTIONS IN A MULTICARRIER COMMUNICATION SYSTEM

(75) Inventors: Clive K. Tang, Irving, TX (US); Giridhar D. Mandyam, San Diego, CA (US)

(73) Assignee: Nokia Corporation, Espoo (FI)

( * ) Notice: Subject to any disclaimer, the term of this patent is extended or adjusted under 35 U.S.C. 154(b) by 597 days.

(21) Appl. No.: 11/291,232

(22) Filed: Nov. 30, 2005

(65) Prior Publication Data

US 2007/0121741 A1 May 31, 2007

(51) Int. Cl.
*H04L 27/28* (2006.01)
*H04J 11/00* (2006.01)

(52) U.S. Cl. .................. 375/260; 370/210
(58) Field of Classification Search ............. 375/260, 375/285, 295, 316, 346, 350; 370/208, 210; 708/400, 402, 405
See application file for complete search history.

(56) References Cited

U.S. PATENT DOCUMENTS

| | | | | |
|---|---|---|---|---|
| 5,541,955 A | * | 7/1996 | Jacobsmeyer | 375/222 |
| 6,005,855 A | * | 12/1999 | Zehavi et al. | 370/335 |
| 7,020,226 B1 | * | 3/2006 | Kirkland | 375/355 |
| 7,430,241 B2 | * | 9/2008 | Vasudevan et al. | 375/259 |
| 2004/0062212 A1 | | 4/2004 | Mandyam | 370/281 |
| 2005/0025040 A1 | | 2/2005 | Tang et al. | 370/208 |
| 2005/0195915 A1 | | 9/2005 | Raleigh et al. | 375/267 |
| 2008/0186843 A1 | * | 8/2008 | Ma et al. | 370/210 |

OTHER PUBLICATIONS

Giridhar Mandyam, "Sinusoidal Transforms in OFDM Systems", IEEE Transactions on Broadcasting, vol. 50, No. 2, Jun. 2004, pp. 172-184, sections I and VI-V, figure 2, abstract.
Giridhar Manddyam, "Interspersed Sinusoidal Transforms for OFDM Systems", Signals, Systems and Computers, 2004, Conference Record of the Thirty-Eighth Asilomar Conference on, vol. 1, pp. 1025-1029, Nov. 7-10, 2004, sections 1 and 3, figure 2, abstract.
Clive Tang et al., "Performance of OFDM Modem with Alternative Basis Functions", Radio and Wireless Symposium, 2006 IEEE, pp. 551-554, Jan. 17-19, 2006, sections I and VI, abstract.

* cited by examiner

Primary Examiner—Khanh C Tran
(74) Attorney, Agent, or Firm—Harrington & Smith, PC

(57) ABSTRACT

A method for transmitting a signal uses a channel impulse response to determine a sub-carrier frequency function for at least two different basis functions. For each of the at least two sub-carrier frequency functions, a performance measure is predicted using the associated frequency function. These predicted performance measures are then stored and compared. One of the at least two basis functions are selected based on the comparing. A signal to be transmitted is converted from the frequency to the time domain using the selected basis function, and then transmitted over multiple sub-carriers via a time radio-frequency channel. Adaptive modulation, coding, bit and/or power loading may also be used in conjunction with the adaptive basis functions. A transmitter, modulator, and computer program are also described.

40 Claims, 10 Drawing Sheets

ADAPTIVE BASIS FUNCTIONS IN A MULTICARRIER COMMUNICATION SYSTEM

TECHNICAL FIELD

This disclosure relates to adaptive frequency division multiple access communications, especially adapting to channel conditions the function by which a signal is converted between frequency and time domains.

BACKGROUND

Frequency division multiplexing (FDM) is a technology that transmits multiple signals simultaneously over a single transmission path, such as a cable or wireless system. Each signal travels within its own unique frequency range (carrier), which is modulated by the data (text, voice, video, etc.).

An orthogonal FDM (OFDM) technique distributes the data over a large number of sub-carriers that are orthogonal to one another. The orthogonal property of the sub-carriers means that the sidebands of individual sub-carriers may overlap and the signals are still received without adjacent sub-carrier interference. The benefits of OFDM include high spectral efficiency, resiliency to RF interference, and lower multipath distortion. This is useful because in a typical terrestrial wireless communications implementation there are multipath channels (i.e., the transmitted signal arrives at the receiver using various paths of different length and different fading characteristics).

OFDM has been successfully deployed in indoor wireless LAN and outdoor broadcasting applications. For example, OFDM has been selected as the multiple access scheme by several standard organizations, including IEEE 802.11, IEEE 802.16, DVB-T (digital video broadcast-terrestrial), and DVB-H (handheld). OFDM beneficially reduces the influence of inter-symbol-interference with a complexity that is less than that of typical single carrier adaptive equalizers. OFDM has also been found to work well in multipath fading channels. These and other advantages render OFDM a strong candidate for use in future mobile communication systems, such as one being referred to as 4 G (fourth generation).

Under a frequency selective fading channel each sub-carrier of an OFDM modem is attenuated differently. The resultant sub-channel frequency functions are frequency-variant and may also be time-variant, hence adaptive modulation is often applied to an OFDM modem to improve the error performance and/or data throughout by assigning different transmission power and/or modulation and coding schemes to different sub-carriers. One aim is to achieve a good trade-off between throughput and error performance; another possible target is to maximize the net data throughput only, regardless of the resultant error performance. It is known to achieve performance goals by adjusting the sub-carriers' power and/or their modulation & coding scheme assignments. These are collectively known in the OFDM literature as adaptive OFDM, or bit/power loading.

Conventional OFDM modems employ inverse Fourier transforms in the transmitter to convert an OFDM symbol from the frequency domain to the time domain. Whereas the input to a processing block that performs the inverse Fourier transform is typically a (coded or uncoded) modulated symbol that is actually in the time domain, it is a well understood convention in the communication arts to refer to a symbol input to an inverse Fourier transform block as a frequency domain symbol, and the output from that block as a time domain symbol since that output symbol is to be sent over a time channel. This description employs that same convention. In adaptive OFDM according to the prior art, bit and/or power loading of each sub-carrier is adjusted based on channel conditions measured at the recipient of the data and fed back to the sender, or estimated by the sender based on return signals received from the recipient over the various sub-carriers. By adaptively loading more bits into the sub-carriers that have a higher signal to noise ratio, for example, throughput (defined as [1−error rate]*data rate) can be increased as compared to loading all sub-carriers with the same number of bits, without using additional bandwidth.

As increasing volumes of data is passed over finite bandwidth, especially with users wirelessly moving audio and video files, what is needed in the art is a method and apparatus to increase data throughput and/or improve error performance over that finite bandwidth. While described below in the context of an OFDM communication system, the invention may be used to advantage in any frequency-division multiplexed communication systems including OFDM and MC-CDMA.

SUMMARY

The foregoing and other problems are overcome, and other advantages are realized, in accordance with the presently described embodiments of these teachings.

In accordance with one embodiment, the invention is a method for transmitting a signal. For each of at least two basis functions, a sub-carrier frequency function of a channel impulse is determined. For each of the at least two sub-carrier frequency functions, a performance measure is predicted using the associated frequency function. These predicted performance measures are then stored and compared. One of the at least two basis functions is selected based on the comparing. A signal to be transmitted is then converted from the frequency domain to the time domain using the selected basis function.

In accordance with another embodiment, the invention is a program of machine-readable instructions, tangibly embodied on a computer-readable medium and executable by a digital data processor, to perform actions directed toward executing an adaptive basis function on a signal to be transmitted. The actions include, for each of at least two basis functions, determining a sub-carrier frequency function from a channel impulse response. For each of the at least two sub-carrier frequency functions, a performance measure is predicted using the associated frequency function, and stored. Each of the stored predicted performance measures are compared, and one of the at least two basis functions is selected based on the comparison. A signal to be transmitted is converted from the frequency domain to the time domain using the selected basis function.

In accordance with another embodiment is a transmitter that has an input for receiving an input frequency domain signal from a source, a modulator, a processor, and an output. The modulator is for adaptively converting the frequency domain input signal to an output signal in the time domain by one of at least two basis functions, according to a command signal. The processor is coupled to the modulator for selecting, using a channel feedback, one of the at least two basis functions, and for providing the command signal to the modulator, directing it as to which basis function to use to convert the input frequency domain signal. The transmitter further has at least one transmit antenna for transmitting the converted signal over a channel, the channel including a plurality of sub carriers.

The invention may be embodied in one or more components of a transmitter. In accordance with another embodiment is a modulator that has a first input for receiving a frequency domain signal from a source, and a second input coupled to an output of a processor. A modulator sub-block is for applying a modulation to the frequency domain signal that is input at the first input. The modulator further has a basis function sub-block which has an input coupled to the modulation sub-block. The basis function sub-block is for converting the modulated frequency domain signal to the time domain according to one of at least two basis functions. One of the basis functions is selected according to a command signal received over a command input that is coupled to the processor. The modulator further has an output for coupling the basis function sub-block to a transmit antenna.

In accordance with another aspect, the invention is a receiver that has at least one receive antenna for receiving a signal and a demodulator. The signal includes a time-domain symbol. The demodulator is for adaptively converting the received time domain symbol to the frequency domain by a selected one of at least two basis functions. The one basis function is selected according to a characteristic of the received signal, such as at least one bit in the received signal, a measure of channel quality determined by the receiver, or other means.

Further details as to various embodiments and implementations are detailed below.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

The following abbreviations are used in this description:
AWGN—additive Gaussian white noise
BER—bit error rate
CIR—channel impulse response
DCT—Discrete Cosine Transform
DFT—Discrete Fourier Transform
DST—Discrete Sine Transform
IDCT—Inverse Discrete Cosine Transform
IDFT—Inverse Discrete Fourier Transform
IDST—Inverse Discrete Sine Transform
OFDM—orthogonal frequency division multiplex
RF—radio frequency
SER—symbol error rate
SNR—signal-to-noise ratio While the following description is in the context of OFDM, these teachings apply to any multi-carrier communication technique, including for example OFDM and MC-CDMA. Conventional OFDM modems employ Discrete Fourier Transform (DFT) as the basis function, the mathematical function by which data symbols are converted between the frequency domain and the time-domain. At the transmitter, the basis function is an inverse DFT (IDFT) converting from the frequency domain OFDM symbol or signal to the time domain. At the receiver, the basis function is a (forward) DFT converting the received time domain OFDM symbol or signal back to the frequency-domain. For purposes of this description, both forward and reverse execution of the same function (e.g., DFT and IDFT) is considered the same basis function because they both rely on the same mathematical transform.

Recently, the use of other sinusoidal transforms has been proposed as alternative basis functions for OFDM; for example, Discrete Cosine Transform (DCT) and Discrete Sine Transform (DST). Because the sub-carrier frequency functions for these alternative basis functions are different from that of DFT, for a given channel impulse response the performance of identical OFDM modems using different basis functions is typically also different. This invention describes using the basis function as an adaptive parameter, in addition to or as an alternative to, known techniques of adaptive bit loading and adaptive power loading of the sub-channels. These techniques exploit the frequency diversity inherently available in the sub-carriers to improve the error performance and/or data throughput under a multipath channel. As with adaptive bit/power loading, adaptation of the basis function is based on the condition of the sub-carriers to improve performance. Adaptively applying a basis function at an OFDM modem can be used to meet, improve, or optimize certain performance criteria. The inventors have found no prior art that adapts the basis function in a multi-carrier communication system, either with or without additional adaptation of bit loading and/or power loading of sub-carriers.

Figure 1:
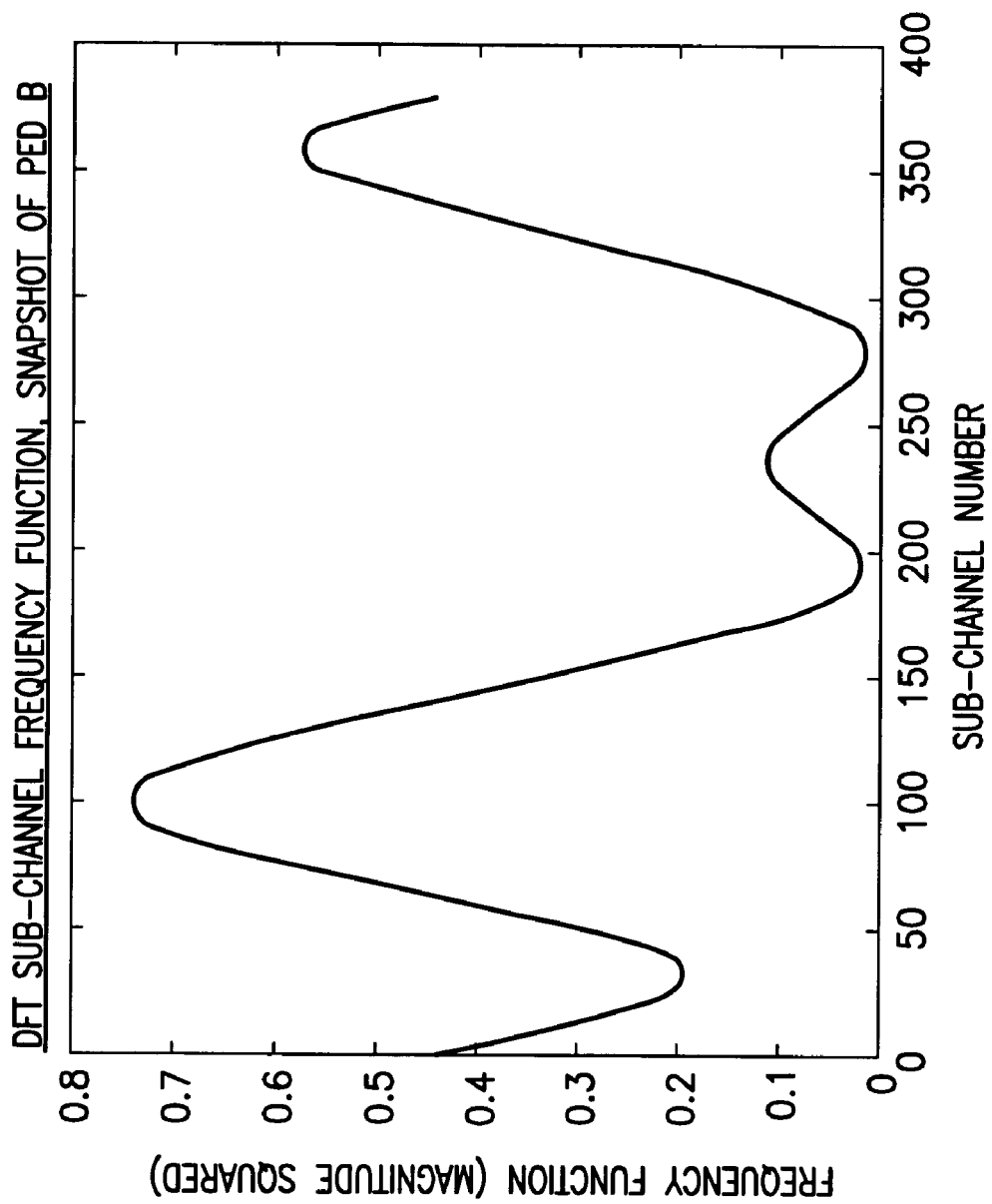
FIG. 1 is a graph of an example sub-channel frequency function for a number of sub-channels using a discrete Fourier transform as the basis function.
Figure 2:
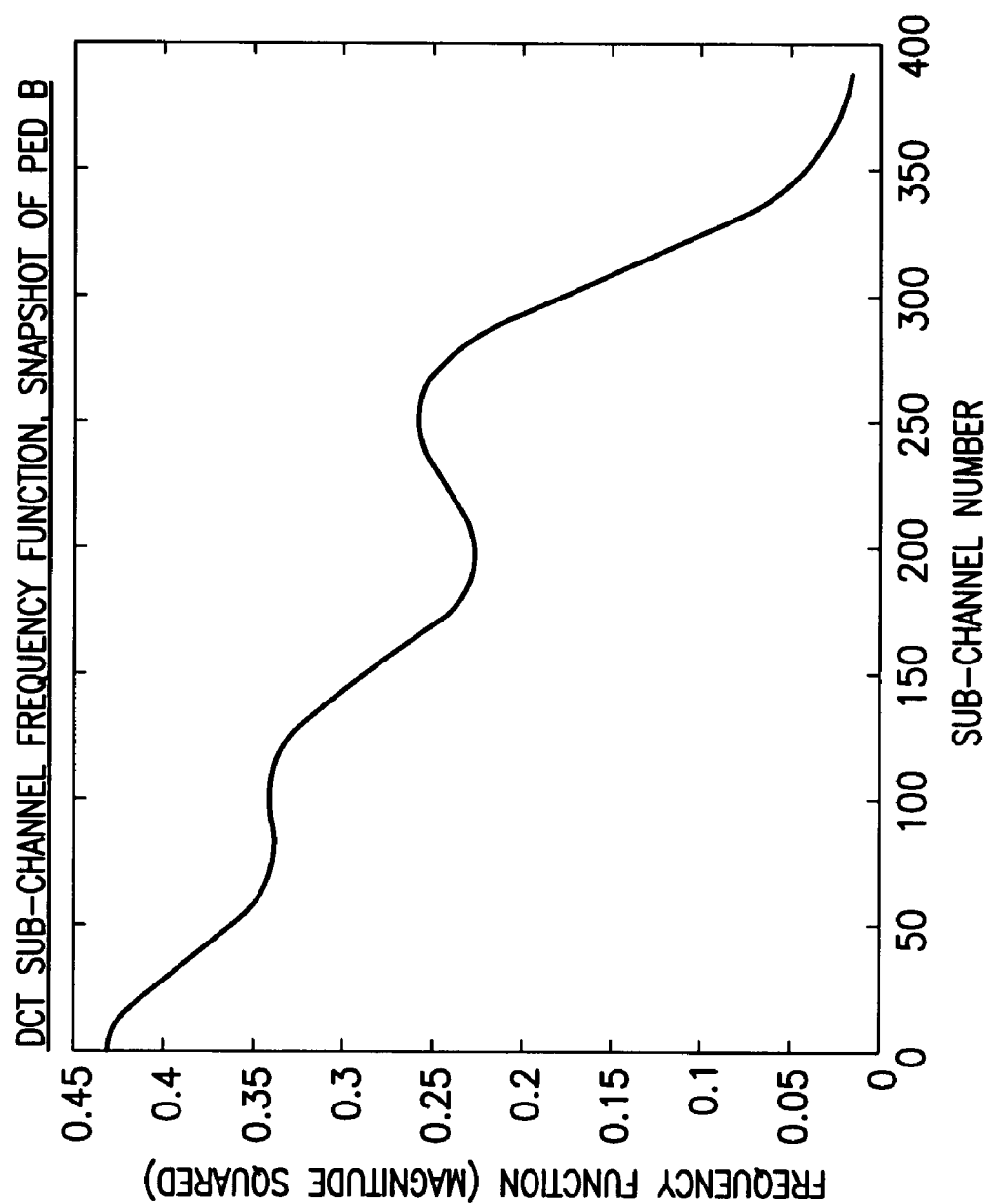
FIG. 2 is similar to FIG. 1, but using a discrete Cosine transform as the basis function.

Since in an OFDM modem, the performance depends on the sub-channel frequency function (which in turn relies on the channel impulse response) and for a given channel profile, the Sub-channel frequency functions are different between different basis functions, it follows that the OFDM modem's performance will also be different when different basis functions are used. Adapting for basis function can then be used, in addition to or in place of bit/power adaptation, in order to meet, improve or optimize certain performance criteria. FIGS. 1 and 2 show graphically the potential advantage that may be achieved. FIG. 1 is a graph of a snapshot in time of the DFT sub-channel frequency function plotted on the pedestrian B channel, plotting magnitude squared of the frequency function along the vertical and sub-channels along the horizontal. Compare the FIG. 1 results using DFT as the basis function with FIG. 2 that uses DCT as the basis function, all other parameters unchanged. In FIG. 2, the frequency function drops off relatively continuously with increasing sub-channel number, but note the difference in frequency function scale between FIGS. 1 and 2. The relevant focus of the distinction is that the sub-channel frequency function varies according to the basis function used to convert between frequency and time at any given set of channel conditions. Where FIGS. 1 and 2 represent uncoded data, the frequency function as illustrated may serve as a BER indicator; those sub-channels with poor frequency function tend to exhibit high BER and to dominate the overall BER for the channel. Correlation between frequency function and BER is attenuated for the case of coded data, so a frequency function plot would not provide an accurate comparison of BER for the coded case. Regardless, FIGS. 1 and 2 illustrate that for the same CIR, the sub-channel frequency function can vary drastically with basis function.

Of course, the adaptive nature of the OFDM modem according to embodiments of the invention allows the basis function to change to DFT when channel conditions favor DFT over DCT. The period at which basis function may be changed is preferably an OFDM symbol interval but may be extended to several OFDM symbol intervals or more. Typically, multiple modulated data symbols are loaded into a single OFDM symbol.

Before transmitting an OFDM symbol (or a number of them), the channel impulse may be examined and the sub-channel frequency function evaluated for each of the available basis functions, such as those illustrated in FIGS. 1 and 2. From the sub-channel frequency functions and prior to transmitting the symbol, the OFDM modem's performance may be predicted and the performance goals compared between the different basis functions. As detailed above, an evaluation of the basis function alone may not directly predict performance, but performance can be mathematically derived from the basis function. One basis function is selected as the best, that which predicts the best performance for a given channel condition. The next OFDM symbol is then processed (converted from the frequency to the time domain) using the selected basis function. When added to bit and power adaptation, selection of the best basis function gives an extra-dimension in the adaptation and allocation processes, and opens up new avenues to solve an existing problem that is well known in the OFDM literature. Of course, adaptation of basis function need not be done in conjunction with adaptive bit and power loading over the subcarriers.

Fast algorithms for implementing DCT/DST are readily available, and algorithms for implementing DCT are well known in the art. Adaptive basis functions may be implemented in the transmitter, the receiver, or both of an OFDM system via software and/or hardware. Two way signalling will generally be required between the transmitter and receiver to carry the necessary control information having a reasonable degree of accuracy, for example the channel conditions. Of course, adding basis function adaptation to bit and power loading adaptations adds complexity and computational load. Replacing bit and/or power loading adaptation in favor of basis function adaptation may diminish that computational overhead, but it is anticipated that bit and power adaptation in conjunction with basis function adaptation would provide an improvement in error and/or throughput performance leading to an increase in system capacity to justify the added processor calculations. Any marginal improvement for adaptation of basis function, as well as bit and power loading, depends on specific channel conditions.

Figure 3A:
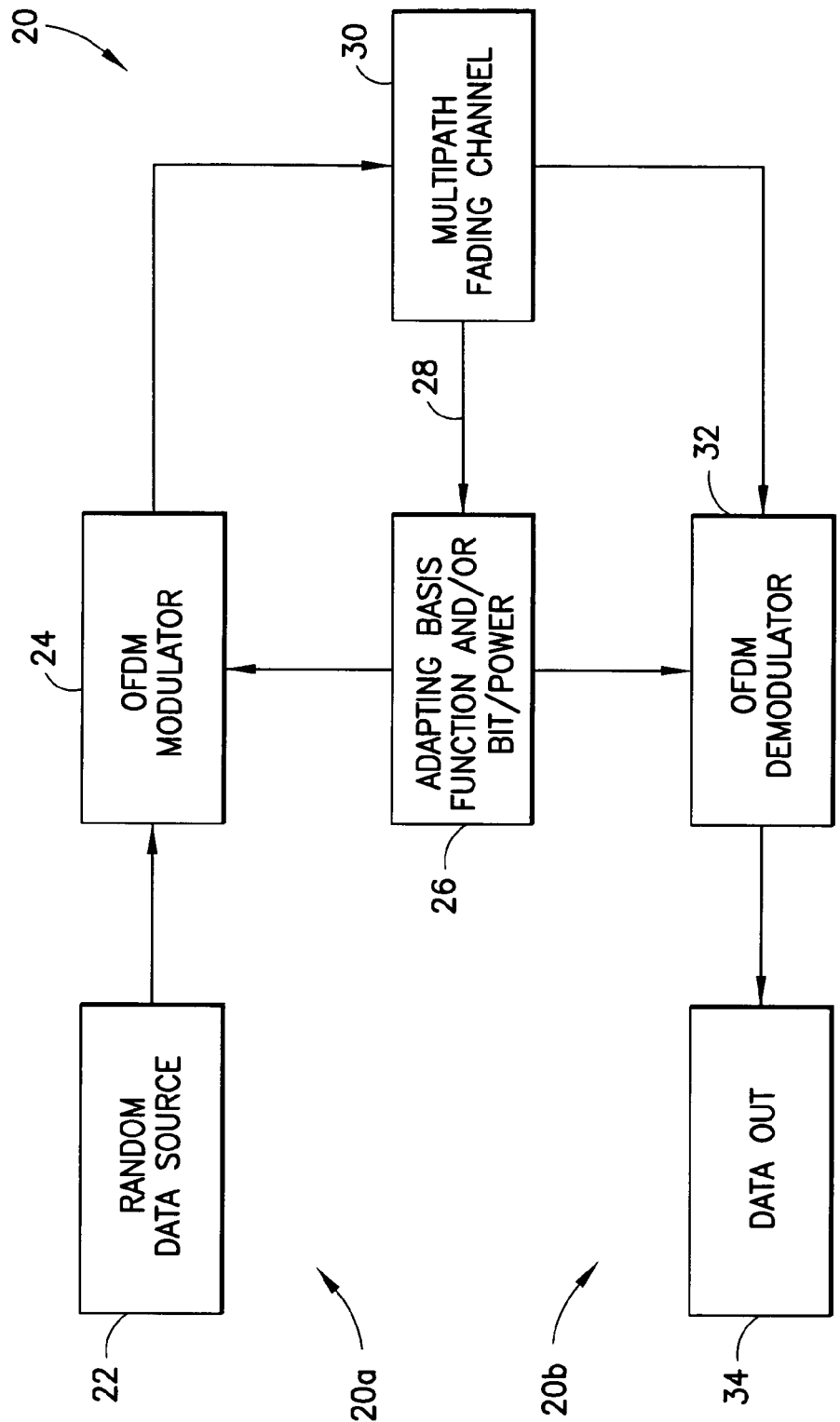
FIG. 3A is a high level schematic block diagram of relevant portions of an OFDM transceiver according to an embodiment of the invention.

A high level diagram of an OFDM transceiver 20 adapted to embody the invention is shown in FIG. 3A. While a single transceiver 20 is shown, it is understood that the separate transmitter 20a and receiver 20b do not communicate with each other but rather with other transceivers over the subcarriers/channel 30. A data source 22 provides user data to an input of an OFDM modulator 24. Unlike the prior art in which the modulator is capable of executing only one basis function, the OFDM modulator 24 is capable of transforming a signal by any of several basis functions, such as IDFT, IDCT, or IDST to name only three. Before transforming the user data from the frequency domain to the time domain in the OFDM modulator 24, an adaptive basis function block 26, such as a processor, predicts performance using a feedback 28 that can be used to predict/ascertain channel conditions. This may be the same feedback 28 used in other OFDM transceivers for adapting bit and power loadings. Preferably, the feedback 28 is a measure of channel conditions directly from the intended recipient of the user data yet to be sent, and preferably is valid within a channel coherence interval that includes the time that the data from the source 22, which has not yet been sent, is transmitted. Such a direct feedback 28 provides a valid channel impulse response for the same sub-carriers over which the data is to be sent.

From the predicted performance given the channel conditions determined using the feedback 28, the adaptive basis function block 26 selects that particular basis function for which performance is maximized, such as by maximizing a data rate subject to an error constraint, maximizing throughput (subject to or without an error constraint) minimizing bit/symbol error rate (either instantaneous in each sub-carrier or averaged over all sub-carriers), or minimizing sub-carrier power subject to an error constraint. Other performance measures may be used, including optimizing for some combination of multiple performance measures. Of course, the adaptive basis function block 26 may also impose adaptive bit and/or power loading in addition to the adaptive basis function to advantage, as noted above. Once one basis function is selected (and any other adaptive loading scheme implemented), the adaptive basis function block 26 informs the OFDM modulator 24 which basis function to use when processing the next OFDM symbol of user data from the source 22. The OFDM modulator 24 executes the selected transform, further processing is done (not shown) as known generally in the art of adaptive bit/power loading, and the modulated symbol(s) is transmitted over the multipath fading channel 30, preferably within the coherence interval for which the feedback 28 remains valid.

At the receiver 20b, the time-domain signal is received from the channel 30 and transformed at the OFDM demodulator 32 using the inverse of the basis function used at the transmitter 20a. In actuality, since the transmitter 20a uses an inverse transform as its basis function, the receiver 20b will use the forward transform of that same basis function. The adaptive basis function block 26 determines the proper basis function for demodulating the received signal and informs the OFDM demodulator 32. The proper basis function for demodulating may be determined by a particular bit set in a header of that signal (if basis function adaptation is not more frequent than a packet), by independent examination of the signal payload or symbol itself, by information sent by the transmitter 20a over a control or other channel, by independent prediction from the feedback 28 sent by that same receiver 20b (which the transmitter 20a used to select its modulating basis function), or any of various other means. The demodulated symbol/signal is then output 34 as a demodulated time domain symbol/signal.

Figure 3B:
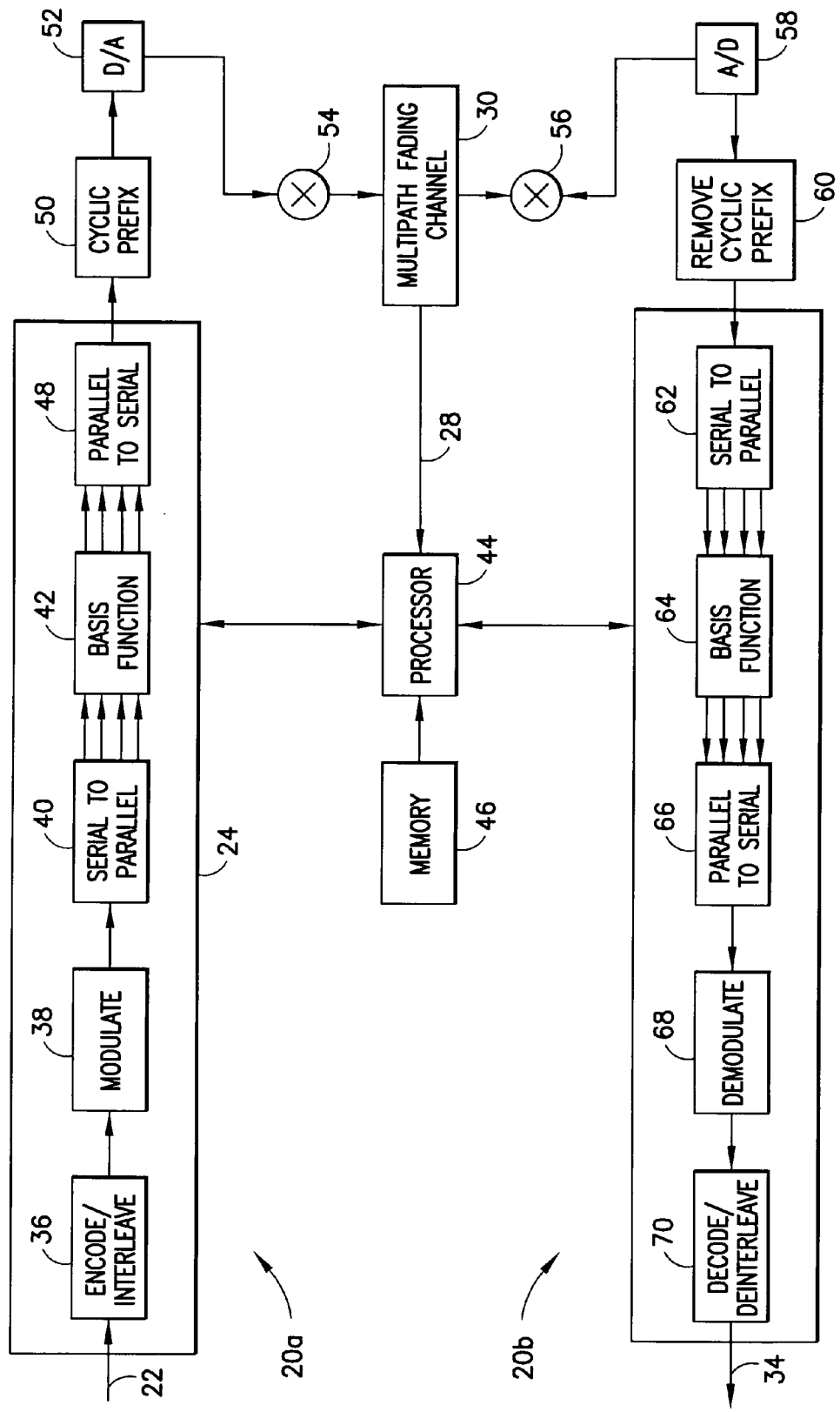
FIG. 3B is a schematic block diagram showing further detail of the transceiver of FIG. 3A.

FIG. 3B illustrates in further detail as compared to FIG. 3A a block diagram of representative components and their functions within an OFDM transmitter 20a and receiver 20b. In the transmitter 20a, the source data 22 is input into the adaptive modulator 24 where it is optionally encoded into codewords that add error and channel coding, and those codewords are then individually or by groups interleaved at an encoder sub-block 36. In the adaptive modulator 24, a modulator sub-block 38 adaptively modulates the input source data. The coding rate and/or the interleave pattern may also be varied adaptively with the modulation. After serial to parallel conversion at S/P sub-block 40, OFDM symbols on the multiple parallel data streams are transformed to the time domain by the selected basis function at the basis function sub-block 42. In a spread spectrum embodiment such as for MC-CDMA, the basis function sub-block 42 is typically also where spreading codes and potentially scrambling codes are applied.

The adaptive basis function block 26 of FIG. 3A is represented in FIG. 3B as a processor 44 coupled to a memory 46. The processor 44 may be a digital signal processor, a general purpose processor, or any such similar processor capable of making the predictions and selecting a basis function as described above. The memory 46 may store the various basis function algorithms as noted above that the processor 44 uses to predict performance and select one basis function to execute on a particular OFDM symbol, and/or a table of pre-calculated results for various channel impulse conditions so that the processor 44 may more readily select one basis function for a given feedback 28 without re-calculating multiple basis function predictions for each OFDM symbol. The parallel data streams are then serialized at P/S sub-block 48, a cyclic prefix is added at prefix sub-block 50, the result is converted at a digital-to-analog converter 52, upconverted at an upconverter 54 to RF frequencies, and the signal is transmitted by one or more transmit antennas (not shown) over the multipath fading channel 30.

The basis function sub-block 42 may apply one or the other of the various basis functions by a command received from the processor 44, which predicted performance in order to make the selection. Call this a command input. As will be shown below, in certain embodiments the modulation and coding scheme may also be adaptable, where different modulation and coding schemes match different basis functions. In that instance, the modulator sub-block 38 may apply a selected modulation to the signal input from the encoder/interleaver sub-block 36 according to a modulation command input received from the processor 44. A coding command signal input from the processor 44 may also be applied to the encoder sub-block 36 to adaptively vary coding rate or interleave pattern, typically in conjunction with adapting modulation at the modulator sub-block 38. Adaptive power loading may additionally be applied at the modulator sub-block 38, according to a power loading selection made by the processor 44 and communicated to the modulator sub-block 38 by a power command from the processor 44. While not shown, one or multiple transmit antennas may be coupled to an output of the upconverter 54. While any or all of these other adaptation regimes may be used in addition to adapting the basis function, only the basis function transforms an input signal from the frequency domain to an output signal in the time domain (and vice versa in the receiver).

In some respects the process at the receiver 20b operates in reverse. The received signal is downconverted to intermediate (or baseband) frequency at a downconverter 56 and converted to digital at an analog to digital A/D converter 58, the cyclic prefix is removed at the prefix sub-block 60, and sent to the demodulator 32. There, the received signal is parallelized at a serial to parallel S/P sub-block 62. The processor 44, in conjunction with the memory 46, directs the demodulator 32 which basis function to apply as detailed above. The proper basis function (which is the inverse of the basis function that was executed in the transmitter 20a at block 42 for the same signal) is executed at the basis function sub-block 64 where the (time domain) signals on the parallel input data lines are transformed by the basis function and converted to output signals in the frequency domain. These frequency domain output signals are then serialized at a parallel to serial P/S sub-block 66 and demodulated at the demodulate sub-block 68. The demodulated output is then decoded and de-interleaved at a decoder sub-block 70, which outputs the data 34 as shown.

Not shown but inherent in the receiver 20b is channel estimation, synchronization and various other functional sub-blocks known in the multi-carrier communication arts to resolve the received signal; these functions are peripheral to the invention and not shown in detail. Some functions may be combined into single physical components and some may be divided among several of the illustrated components. FIGS. 3A-3B are presented merely to give a general context of one relevant environment, and it is in the functions of the transmitter 20a and receiver 20b embodiments that are advantageous rather than the particular disposition of components.

Embodiments of the invention may be disposed in any host computing device having a receiver that processes data received from another device or node, whether or not the host device receives its data wirelessly. A common embodiment is in a mobile station, a handheld portable device that is capable of wirelessly accessing a communication network, such as a mobile telephony network of base stations that are coupled to a publicly switched telephone network. A cellular telephone, a Blackberry® device, a laptop computer with communication capability, and a personal digital assistant (PDA) with internet or other two-way communication capability are examples of a mobile station. These teachings may also be used to advantage in other portable radios such as walkie talkies and devices that may access only local networks such as a wireless localized area network (WLAN) or a WIFI network.

Details as to how the various basis functions may be made interchangeable with one another for different symbols to be transmitted (and different received symbols to be converted back to the time domain) are now described. By symmetrically extending the output sequence of IDCT, or anti-symmetrically for IDST, the resultant transforms possess the cyclic shift properties that are essential for them to be used as OFDM basis functions. For a data sequence x of length N/2, $$x = \left\{ x[0], x[1], x[2], \ldots, x\left[\frac{N}{2} - 1\right] \right\} \quad [1]$$

its symmetrical and anti-symmetrical extensions are given by, $$x_{sym} = \left\{ x[0], x[1], \ldots, x\left[\frac{N}{2} - 1\right], x\left[\frac{N}{2} - 1\right], \ldots, x[1], x[0] \right\} \quad [2]$$

$$x_{asym} = \left\{ x[0], x[1], \ldots, x\left[\frac{N}{2} - 1\right], -x\left[\frac{N}{2} - 1\right], \ldots, -x[1], -x[0] \right\} \quad [3]$$

Let $X_{dct}$ (or $X_{dst}$) be the DCT (or DST) of the symmetrically (or anti-symmetrically) extended sequence $x_{sym}$ (or $x_{asym}$), and $X_{dct\_shift}$ (or $X_{dst\_shift}$) be the DCT (or DST) of the symmetrically (or anti-symmetrically) extended sequence $x_{sym}$ (or $x_{asym}$) cyclic shifted by r samples. Then it can be shown that, $$X_{dct\_shift}[m] = \cos\left(\frac{\pi rm}{N}\right)X_{dct}[m] \quad [4]$$

$$X_{dst\_shift}[m] = \cos\left(\frac{\pi r(m+1)}{N}\right)X_{dst}[m] \quad [5]$$

For the DFT case, it is well-known that the DFT $X_{shift}[m]$ of a cyclic shifted sequence $x[n+r]$ is simply the DFT $X[m]$ of the original sequence $x[n]$ multiplied by an exponential function, $$X_{shift}[m] = e^{\frac{j2\pi mr}{N}} X[m] \quad [6]$$

where N is the DFT length. Now consider a multipath channel with impulse response $h[n]$, $0 \leq n \leq L-1$, with the maximum delay spread equal to $L-1$ samples. Let the time-domain transmitted signal be $x[n]$, $0 \leq n \leq N-1$. The output y of the fading channel is given by the convolution of x and h, and may be formed by multiplying $x[n]$ to $h[0]$ and a delayed version $x[n-1]$ to $h[1]$, $x[n-2]$ to $h[2]$ etc. as, $$y[n] = x[n] \cdot h[0] + x[n-1] \cdot h[1] + x[n-2] \cdot h[2] + \ldots + x[n-L+1] \cdot h[L-1] \quad [7]$$

Because of the above cyclic shift properties, DFT possesses an important attribute—the time-frequency duality principle—that convolution in the time-domain is equivalent to multiplication in the frequency-domain and vice versa. That is, in the frequency domain, the time convolution becomes, $$Y[m] = X[m] \cdot H[m], \quad 0 \leq m \leq N-1 \quad [8]$$

where Y and X are the DFT of y and x respectively. Thus the received signal Y for sub-channel m is simply given by the transmitted signal X multiplied by the frequency function H for that sub-channel. The frequency function H is given by the DFT of the channel impulse as, $$H[m] = \sum_{n=0}^{N-1} h[n] e^{\frac{-j2\pi mn}{N}} \quad [9]$$

Next consider the same scenario but with DFT replaced by DCT. Let $x_{sym}[n]$ be a symmetrically extended sequence of length N. The time convolution with the channel impulse is then:

$$Y[n] = x_{sym}[n] \cdot h[0] + x_{sym}[n-1] \cdot h[1] + x_{sym}[n-2] \cdot h[2] + \ldots + x_{sym}[n-L+1] \cdot h[L-1] \quad [10]$$

Its frequency-domain equivalent is given by:

$$\begin{aligned}Y_{dct}[m] &= DCT \text{ of } (x_{sym}[n] \cdot h[0] + x_{sym}[n-1] \cdot h[1] + \\ &\quad x_{sym}[n-2] \cdot h[2] + \ldots + x_{sym}[n-L+1] \cdot h[L-1]) \\ &= DCT \text{ of } (x_{sym}[n] \cdot h[0]) + DCT \text{ of } (x_{sym}[n-1] \cdot h[1]) + \\ &\quad DCT \text{ of } (x_{sym}[n-2] \cdot h[2]) + \ldots + \\ &\quad DCT \text{ of } (x_{sym}[n-L+1] \cdot h[L-1]) \\ &= X_{dct}[m] \cdot h[0] + \cos\left(\frac{\pi m}{N}\right) \cdot X_{dct}[m] \cdot h[1] + \cos\left(\frac{\pi 2m}{N}\right) \cdot\end{aligned} \quad [11]$$

$$\begin{aligned}&X_{dct}[m] \cdot h[2] + \ldots + \cos\left(\frac{\pi(L-1)m}{N}\right) \cdot X_{dct}[m] \cdot h[L-1] \\ &= X_{dct}[m]\left(h[0] + \cos\left(\frac{\pi m}{N}\right) \cdot h[1] + \cos\left(\frac{\pi 2m}{N}\right) \cdot h[2] + \ldots + \right.\\ &\quad \left. \cos\left(\frac{\pi(L-1)m}{N}\right) \cdot h[L-1]\right)\end{aligned}$$

since DCT is a linear operator and the DCT of a cyclic shifted (and symmetrically extended) sequence $x_{sym}[n-r]$ is $$\cos\left(\frac{\pi rm}{N}\right)X_{dct}[m].$$

Hence one may write, $$Y_{dct}[m] = X_{dct}[m] \cdot H_{dct}[m], \quad 0 \leq m \leq N-1 \quad [12]$$

where $$H_{dct}[m] = \begin{pmatrix} h[0] + \cos\left(\frac{\pi m}{N}\right) \cdot h[1] + \cos\left(\frac{\pi 2m}{N}\right) \cdot h[2] + \ldots + \\ \cos\left(\frac{\pi(L-1)m}{N}\right) \cdot h[L-1] \end{pmatrix}$$

Similar derivation for the DST function yields, $$Y_{dst}[m] = X_{dst}[m] \cdot H_{dst}[m], \quad 0 \leq m \leq N-1 \quad [13]$$

where $$H_{dst}[m] = \begin{pmatrix} h[0] + \cos\left(\frac{\pi(m+1)}{N}\right) \cdot h[1] + \cos\left(\frac{\pi 2(m+1)}{N}\right) \cdot h[2] + \ldots + \\ \cos\left(\frac{\pi(L-1)(m+1)}{N}\right) \cdot h[L-1] \end{pmatrix}$$

Thus the time-frequency duality property of DFT can also be extended to DCT or DST with the frequency function obtained from equations [12] & [13] as, $$H_{dct}[m] = \sum_{n=0}^{N-1} h[n] \cdot \cos\left(\frac{\pi mn}{N}\right), \quad m = 0, 1, \ldots, N-1 \quad [14]$$

$$H_{dst}[m] = \sum_{n=0}^{N-1} h[n] \cdot \cos\left(\frac{\pi(m+1)n}{N}\right), \quad m = 0, 1, \ldots, N-1 \quad [15]$$

Therefore DCT or DST may be used as an alternative to DFT as the OFDM basis function. The summation in equations [14]-[15] now ends at $N-1$ instead of $L-1$ as in equations [12]-[13], this represents the general case when the channel length can be up to N taps long. In practice, $L \leq N$ and $h[n]=0$, $n \geq L$. The addition of cyclic prefix of length longer than the maximum channel delay spread is still needed as in the case of DFT. Note that equations [14] & [15] are not the DCT or DST of the sequence $h[n]$. In a DCT (DST) based OFDM system, the sub-channel frequency function is not given by the DCT (DST) of the channel impulse response but rather by these equations.

Since in an OFDM modem, the performance depends on the sub-channel frequency function (which in turn relies on the channel impulse response) and, for a given channel impulse, the DFT, DCT & DST sub-channel frequency functions are different from each other, as evident from equations [9], [14] & [15], it follows that the OFDM modem's performance will be different for the different basis functions. The number of data bits loaded into an OFDM symbol may also be different because of the symmetrical extension requirement for DCT/DST. Note that the odd (even) sub-carriers of the DCT (DST) output are always zero, thus it is possible to superimpose, or intersperse, the transforms to double the data rate.

This is the reason that the different sub-channel frequency functions of FIGS. 1 and 2, taken as a 'snapshot' from the ITU Pedestrian B channel, exhibit different responses at different subcarriers for the same channel conditions. As the channel varies, the DFT & DCT frequency functions also vary with the channel impulse.

Because of the differences in the sub-channel frequency functions, an adaptive OFDM system that switches between different basis functions in order to meet, improve or optimize some performance criteria may prove advantageous to better adapt to the channel conditions. Based on the DFT/DCT/DST frequency functions calculated from the channel impulse, certain performance functions may be evaluated and the basis function selected accordingly. For a fading channel whose impulse response is time-varying, the channel should be examined in an OFDM-symbol-by-OFDM-symbol basis or other regular intervals. For instance, one possible performance criterion is the error probability, whose instantaneous value may be predicted from the sub-channel SNR for popular un-coded modulation schemes and then applied as a measure to determine what basis function to use for that OFDM symbol interval, with the aim of lowering the overall BER while maintaining the same data rate. Alternatively, throughput increased or decreased within the constraints of that target BER, the basis function may be adapted to ensure the highest data throughput within the constraints of that target BER. This alternative assumes that more than one basis function would meet or exceed the target BER for a given adaptation interval. As detailed below, maximizing SNR is used as a predictor of minimized BER/SER.

The adaptive OFDM system based on adapting the basis functions may be outlined in one embodiment as follows:
(a) Before transmitting an OFDM symbol (or a block of OFDM symbols), calculate the DFT/DCT/DST sub-channel frequency functions assuming the channel impulse response (CIR) is known. In practice, the CIR may be obtained by channel estimation and/or prediction and requires a feedback path from the receiver, such as that currently used in adaptive bit and power loading.
(b) The instantaneous sub-channel SNR function (a surrogate for BER/SER) is calculated for each of the various (DFT/DCT/DST) frequency functions as, $$SNR_n = \frac{P_n |H_n|^2}{N_o} \qquad [16]$$

where n, $P_n$, $H_n$ and $N_o$ are the sub-carrier number, transmitted symbol power for the nth sub-carrier, frequency function for the nth sub-carrier for the basis function of interest and average noise power respectively.
(c) For each of the basis functions, apply an adaptive scheme to alter the bit/power loading in each sub-carrier based on the sub-channel SNR function. The bit/power adaptation scheme may be one known in the art or yet to be developed. The simplest bit/power loading scheme is not adaptive, an 'equal-power-equal-bit' scheme in which all sub-carriers are loaded with the same number of bits and allocated with the same power. Evaluate the performance criteria for each of the basis functions, compare the results and select the basis function that fulfills the desired requirements (or that maximizes/minimizes a parameter within transmission requirements, such as maximizing throughput while meeting a target BER).
(d) With the selected basis function, load up the sub-carriers with the modulated data symbols, transform the OFDM symbol into time-domain, add cyclic prefix and symmetrical extension if necessary and transmit it.
(e) Repeat (a) through (d) for the next OFDM symbol to be transmitted (or next block of OFDM symbols, depending upon the basis function adaptation interval being used).

At the receiver each OFDM symbol is demodulated in the usual manner assuming that the receiver knows what basis function the OFDM symbol is based on. In reality this requires some means, for example extra signals in a controlling channel, to indicate the basis function selected. Other options for informing the receiver, or for the receiver deriving the proper basis function blindly, are detailed above.

Adaptive basis function and/or bit/power loading may be deployed for the following example cases of resource allocation:
(i) Minimize bit/symbol error rate (BER/SER) subject to a fixed data rate. As above, this may be done by using maximized SNR as a surrogate for minimized BER/SER, and may be instantaneous in each sub-carrier or averaged over all sub-carriers.
(ii) Maximize the data rate subject to a target BER/SER or other error constraint.
(iii) Minimize the power subject to a target BER/SER or other error constraint.
(iv) Maximize the throughput ([1-error rate]*data rate) with or without a limiting error constraint.

Other resource allocation parameters known in the art or yet to be developed may also be used in place of or in addition to BER/SER.

To illustrate the advantages of the invention, an adaptive OFDM system was simulated to demonstrate that adapting the basis function can advantageously improve the error performance. A schematic diagram of the adaptive OFDM system is shown in FIG. 3. Both the modulation scheme and the OFDM basis function are adapted according to the channel condition using a simple adaptive scheme. The aim is to reduce the BER while maintaining the same data rate by switching between the two basis functions on an OFDM-symbol-by-OFDM-symbol adaptation interval. For simplicity an 'equal-power-equal-bit' scheme of bit/power loading the subcarriers is applied, i.e. all the sub-carriers share the same power and modulation scheme. At every OFDM symbol, a choice is made between DFT, DCT or DST basis depending on which of them offers a lower predicted error probability. The latter may be predicted in the following way.

As every OFDM sub-carrier experiences flat fading no matter whether the RF channel is multipath or not, effectively each sub-carrier is facing an AWGN channel with different power attenuation from sub-carrier to sub-carrier in general. And since analytical BER expressions as a function of channel SNR are readily available for popular un-coded modulation schemes under AWGN (See for example J. G. Proakis, "Digital Communications", McGraw-Hill, 1995), the instantaneous BER for each sub-carrier may be evaluated and averaged across all sub-carriers to predict the BER for the OFDM symbol. For example, the BER expression for BPSK as a function of channel received SNR X is given by, $$P_{e,bpsk} = Q(\sqrt{2X}) \quad [17]$$

where Q is the Q-function defined by $$Q(x) = \frac{1}{\sqrt{2\pi}} \int_x^\infty e^{-t^2/2} dt, \quad x \geq 0.$$

The instantaneous sub-channel SNR function may be evaluated from equation [16] for each of the sub-carriers, substituted in equation [17] to estimate the BER, and then averaged across all sub-carriers to obtain a BER prediction for the entire OFDM symbol.

Moreover, since the DCT and DST frequency functions as given by equations [14]-[15] differ only by one in the m value within the cosine term, for large values of N (say, N>100 or thereabouts), the two frequency functions are very similar to each other and so their performance should be substantially the same. Hence only one of the two basis functions needs to be considered as an alternative to DFT. In the current simulations DCT was selected as the alternative basis function. For a practical system, the choice may depend on implementation considerations.

The modulation schemes for DFT & DCT basis are chosen so as to maintain the same data rate, namely DFT/BPSK & DCT/QPSK as a possible pair, or DFT/QPSK & DCT/16QAM as another pair. This ensures that N data bits are loaded into the N sub-carriers for the first pair of basis function/modulation scheme, and 2N data bits for the second pair. Thus the basis functions are always rate-matched irrespective of the channel condition.

The steps of this simple adaptive scheme may be summarized as follows:

(a) Before transmitting an OFDM symbol, calculate the DFT & DCT sub-channel frequency functions. The instantaneous sub-channel SNR function is further calculated from each of the DFT & DCT frequency functions for a given transmitted symbol power and average noise power level.

(b) From the DFT sub-channel SNR function, the error probability for each sub-carrier is calculated using the analytical AWGN error expression for the modulation scheme in use. The error probability is then averaged across all the sub-carriers to produce a predicted instantaneous BER for the OFDM symbol. Repeat the same calculation for the DCT sub-channel SNR function.

(c) Select the basis function that offers a lower predicted BER for the OFDM symbol.

(d) With the selected basis function, load up the sub-carriers with the modulated data symbols, transform the OFDM symbol into time-domain, add cyclic prefix and symmetrical extension if necessary and transmit it.

(e) Repeat (a) through (d) for the next OFDM symbol to be transmitted.

Figure 4:
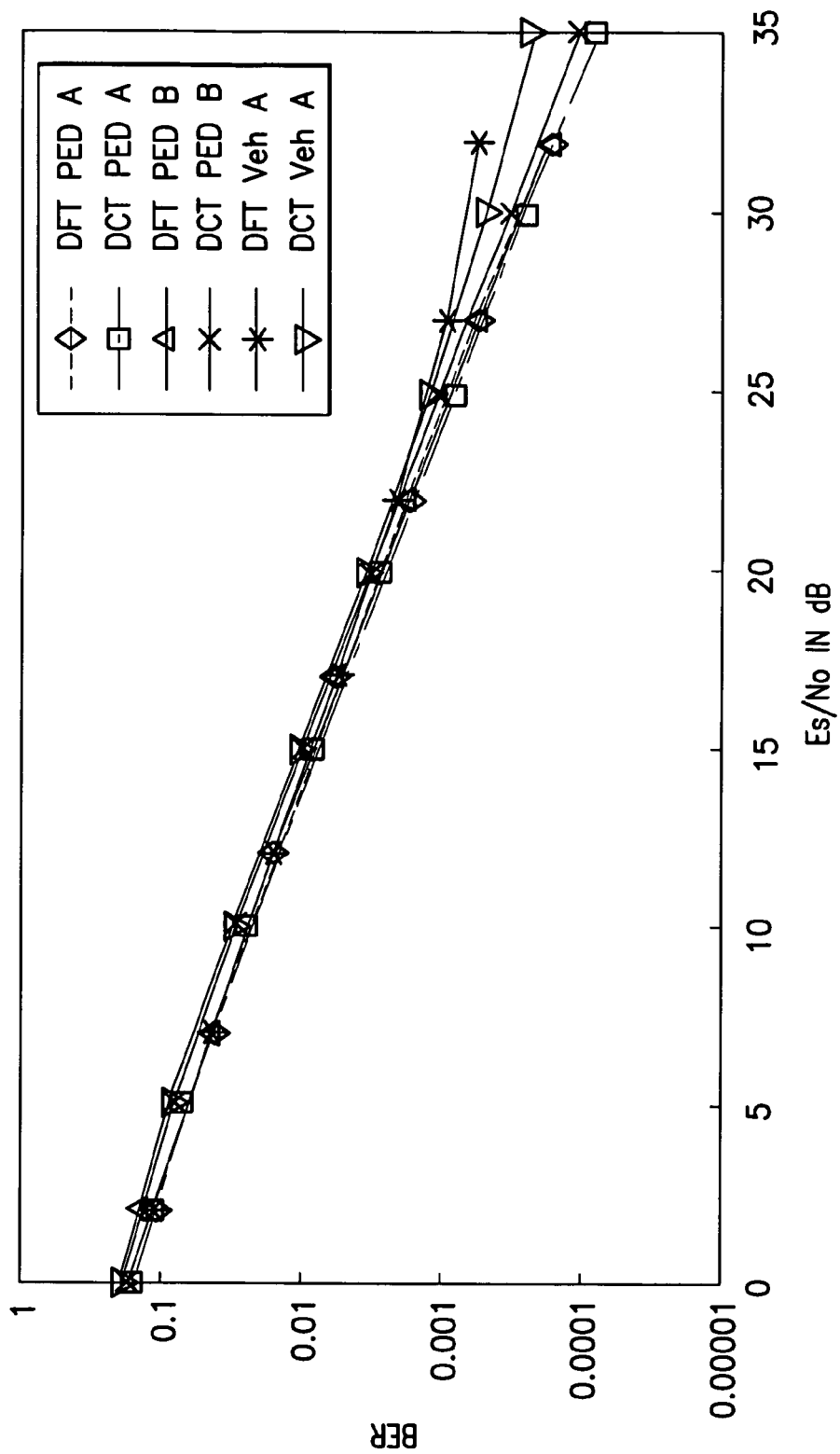
FIG. 4 is a graph of simulated data comparing rate-matched BER results over three different channels for DFT/BPSK and DCT/QPSK using a fixed basis function.
Figure 5:
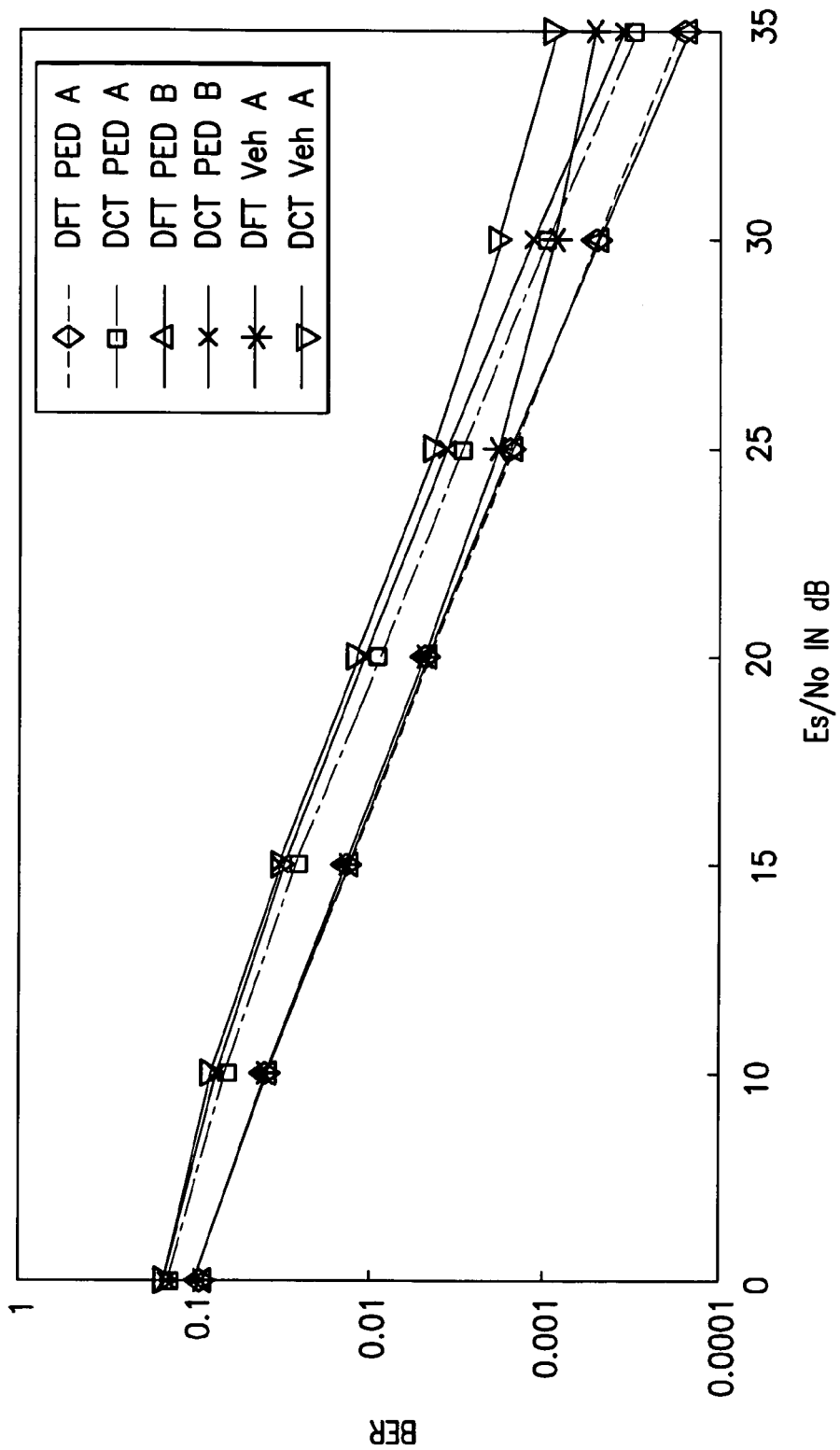
FIG. 5 is similar to FIG. 4 but comparing DFT/QPSK and DCT/16QAM.
Figure 6:
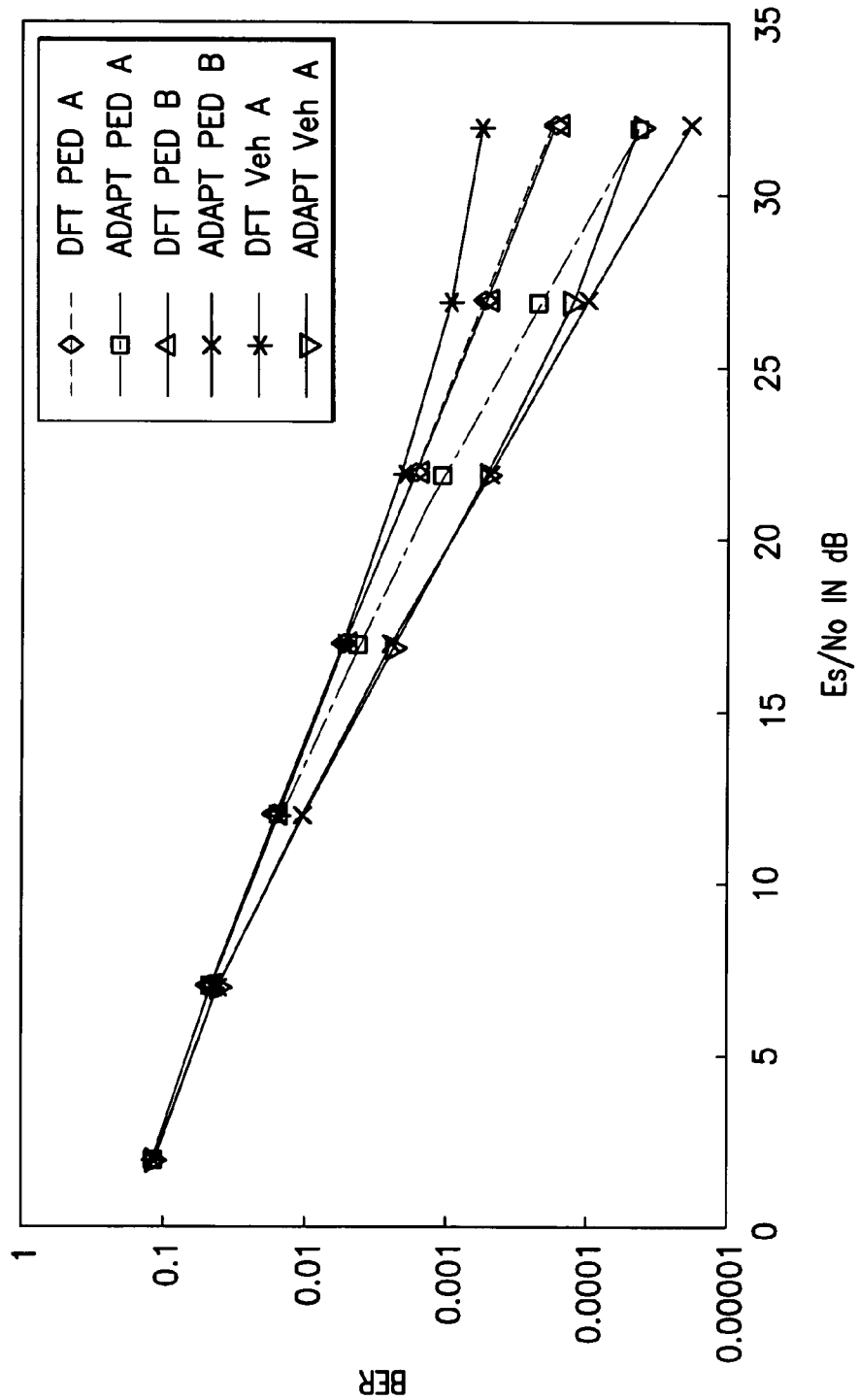
FIG. 6 is similar to FIG. 4 but comparing the rate-matched BER results for an adaptive basis function, also repeating the data of FIG. 4 for comparison purposes.
Figure 7:
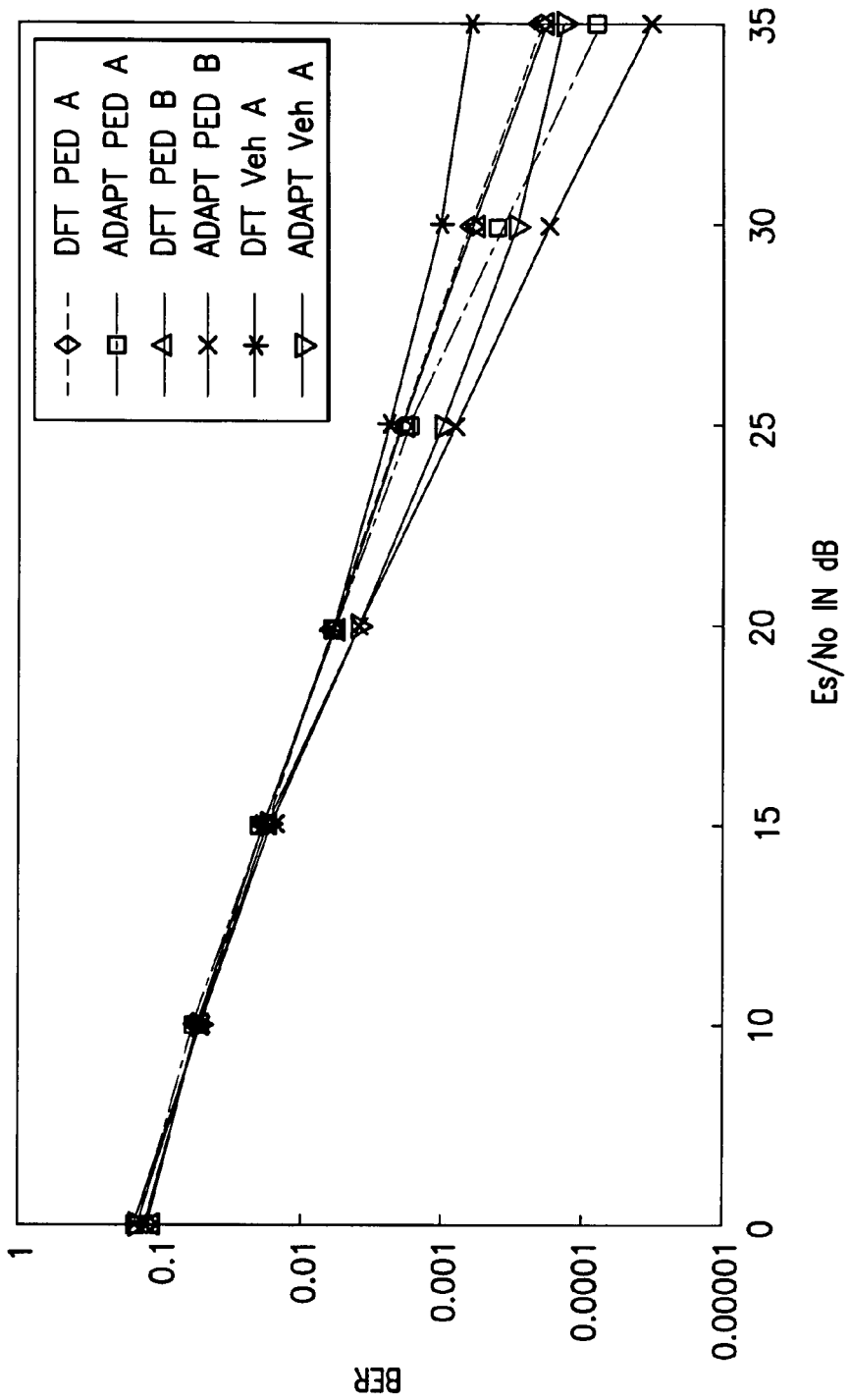
FIG. 7 is similar to FIG. 5 but comparing the rate-matched BER results for an adaptive basis function, also repeating the data of FIG. 5 for comparison purposes.

FIGS. 4 and 5 show the BER curves for the two basis function/modulation scheme combination pairs (DFT/BPSK & DCT/QPSK and DFT/QPSK & DCT/16QAM) respectively under the ITU Pedestrian A, Pedestrian B and Vehicular A channels. They are obtained for reference purpose without any adaptation applied, i.e. they are results of conventional DFT or DCT OFDM with fixed basis function. For the fixed DFT/BPSK & DCT/QPSK case DFT is seen to offer the same or slightly lower BER than DCT (except at high SNR under the Vehicular A channel). For the fixed DFT/QPSK & DCT/16QAM case DFT always appears to be better. The adaptive modulation results are depicted in FIGS. 6 and 7 for the two cases. Also plotted in FIGS. 6 and 7 are the DFT results from FIGS. 4 and 5 for comparison. It is clearly seen that adapting the basis function results in a lower overall BER, with up to 7 dB improvement at high SNR.

Figure 8:
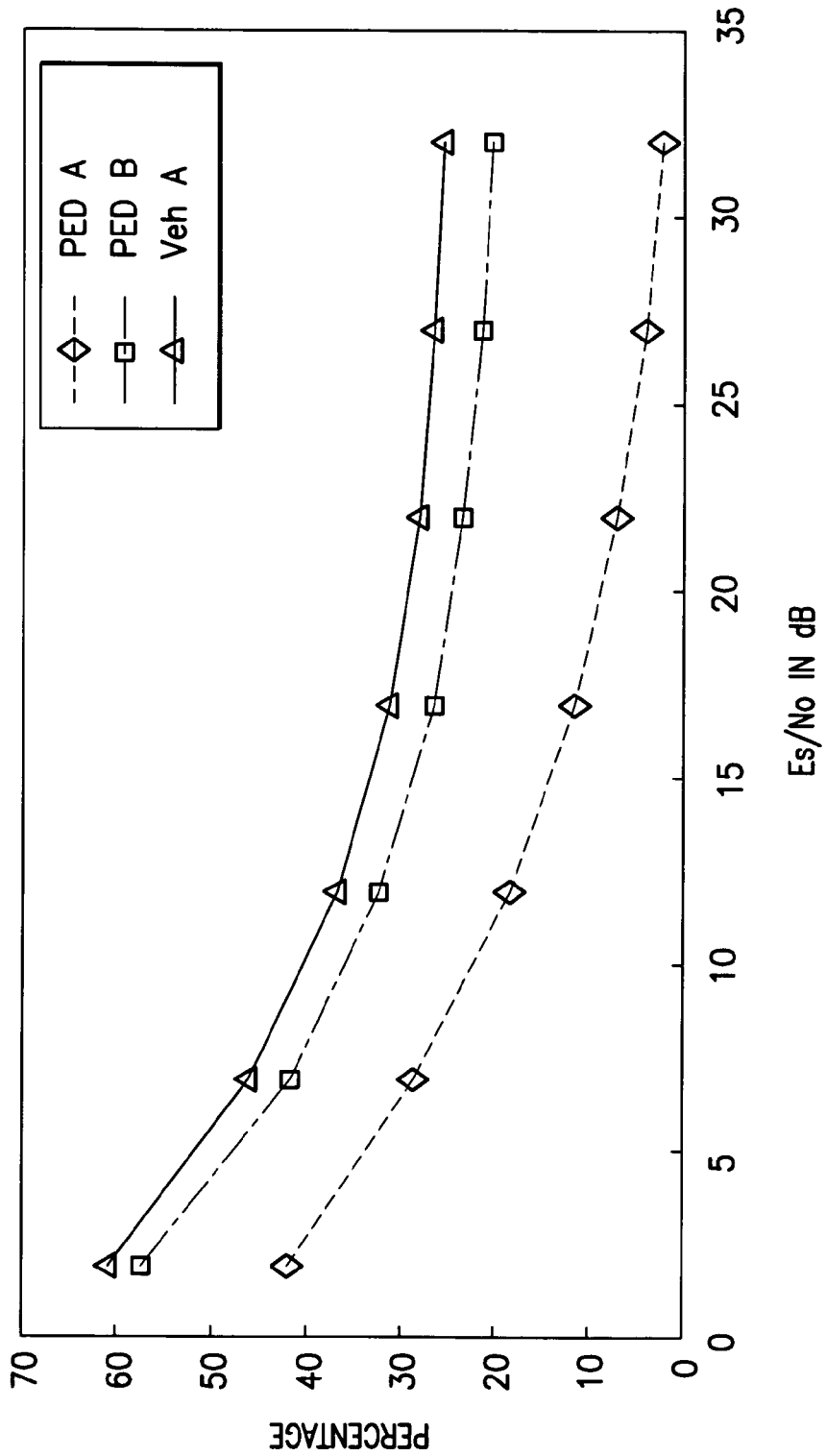
FIG. 8 is a simulated graph of relative percentages of OFDM symbols using the various basis functions for rate-matched BER results when the basis function is adapted between DFT/BPSK and DCT/QPSK.
Figure 9:
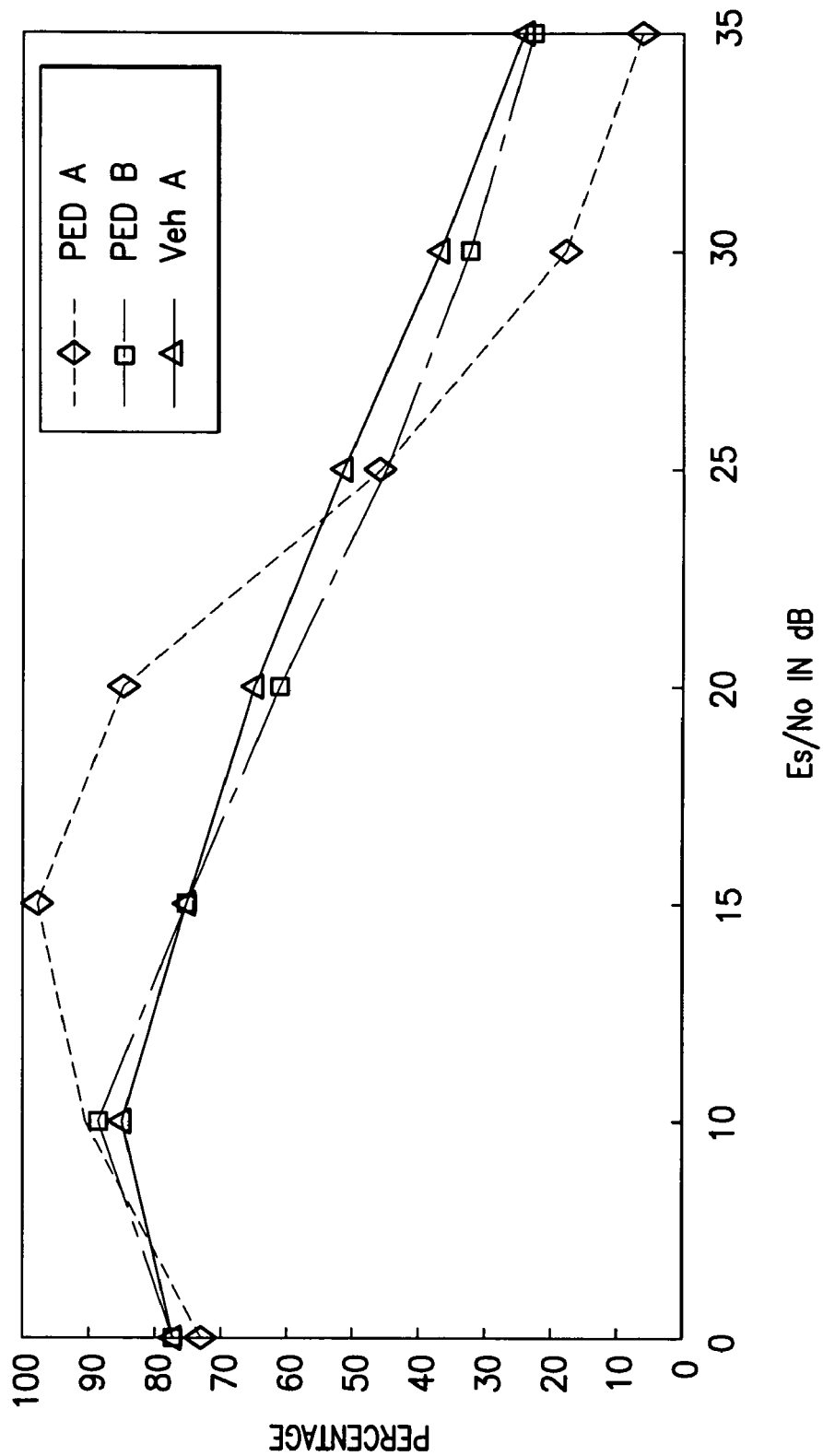
FIG. 9 is similar to FIG. 8, but when the basis function is adapted between DFT/QPSK and DCT/16QAM.

As the adaptive scheme described herein alters the basis function on an OFDM-symbol-by-OFDM-symbol basis, it is instructive to evaluate the average percentage of OFDM symbols that employ DFT as the basis function and plot it against the SNR. FIGS. 8 and 9 show such curves for the two cases under the three channel models. It was found that as the SNR increases, DFT tends to be chosen less frequently as the most advantageous basis function, suggesting that DCT offers a better sub-channel SNR function and hence better error performance at high SNR.

The simple adaptive scheme here readily demonstrates that a significant improvement in error performance can be obtained by merely switching between the basis functions. Inferring from the results of FIGS. 4-9, for those instances where it is sufficient to just meet a target BER/SER and more than one basis function would meet that target, throughput may be increased by adaptively selecting from among the two or more basis functions that would satisfy the target BER/SER for a given channel impulse response.

In summary, by exploiting the fact that different basis functions have different sub-channel frequency functions, adapting the basis function appears to be advantageous and provides a positive impact on the design of adaptive schemes by offering an extra-dimension in the adaptation and allocation processes. In addition to (or in place of) adapting the usual bit/power loading in each sub-carrier, one may now also alter the basis function to achieve the goal. Moreover, one could even divide an OFDM symbol into two OFDM symbols, one with DFT basis and the other with DCT/DST basis. All these offer an extra degree of flexibility to adaptive OFDM, providing additional tools to solve an existing problem that is well-known in the OFDM literature, and create new possibilities not previously available with a single, fixed basis function.

Embodiments of this invention may be implemented by computer software executable by a data processor of a mobile station or other host device, such as the processor 44 and instructions stored in the memory 46, or by hardware, or by a combination of software and hardware. Further in this regard it should be noted that the various blocks of the diagram of FIGS. 3A-3B may be implemented by computer program instruction steps, or interconnected logic circuits, blocks and functions, or a combination of program steps and logic circuits, blocks and functions.

The memory or memories 46 may be of any type suitable to the local technical environment and may be implemented using any suitable data storage technology, such as semiconductor-based memory devices, magnetic memory devices and systems, optical memory devices and systems, fixed memory and removable memory. The data processor(s) 44 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, and described as processes, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method comprising:
using at least in part a transmitter processor, and for each of at least two basis functions, determining a sub-carrier frequency function of a channel impulse response;
for each of the at least two sub-carrier frequency functions, predicting a performance measure using the associated frequency function and storing the predicted performance measure;
comparing each of the predicted performance measures and selecting one of the at least two basis functions based on the comparing; and
converting a signal to be transmitted from the frequency domain to the time domain using the selected basis function.

2. The method of claim 1, wherein a channel quality comprises channel impulse response, the method further comprising:
transmitting the converted signal over a channel from which the channel impulse response derived.

3. The method of claim 2, further comprising transmitting an indication of the selected basis function.

4. The method of claim 1, wherein the at least two basis functions comprise an inverse discrete Fourier transform and at least one of an inverse discrete cosine transform and an inverse discrete sine transform.

5. The method of claim 1, executed once during each of a plurality of consecutive and equal adaptation intervals, said adaptation intervals comprising an integer multiple of one multi-carrier symbol.

6. The method of claim 1, wherein for at least one basis function, the performance measure comprises an error rate, and selecting one of the at least two basis functions comprises selecting that basis function that minimizes the error rate.

7. The method of claim 1, wherein the performance measure comprises a signal to noise ratio SNR, where $$SNR_n = \frac{P_n |H_n|^2}{N_o}$$

for an nth sub-carrier, where, and $P_n$ represents the transmitted symbol power for the nth sub-carrier, $H_n$ represents the frequency function for the nth sub-carrier for the associated basis function, and $N_o$ represents average noise power respectively.

8. The method of claim 1, wherein the performance measure comprises a data rate and selecting one of the at least two basis functions comprises selecting a basis function that maximizes the data rate within an error constraint.

9. The method of claim 1, wherein the performance measure comprises a data throughput rate and selecting one of the at least two basis functions comprises selecting a basis function that maximizes the data throughput rate.

10. The method of claim 9, wherein selecting one of the at least two basis functions comprises selecting a basis function that maximizes the data throughput rate within an error constraint.

11. The method of claim 1, further comprising at least one of: adaptively modulating the signal to be transmitted; adaptively coding the signal to be transmitted, adaptively bit loading the signal to be transmitted, and adaptively power loading sub-carriers on which the signal is to be transmitted.

12. A program of machine-readable instructions, tangibly embodied on a computer-readable medium and executable by a digital data processor, to perform actions directed toward executing an adaptive basis function on a signal to be transmitted, the actions comprising:
for each of at least two basis functions, determining a sub-carrier frequency function from a channel impulse response;
for each of the at least two sub-carrier frequency functions, predicting a performance measure using the associated frequency function, and storing the predicted performance measure;
comparing each of the predicted performance measures and selecting one of the at least two basis functions based on the comparing; and
converting a signal to be transmitted from the frequency domain to the time domain using the selected basis function.

13. The program of claim 12, further comprising
transmitting the converted signal over a channel from which the channel impulse response derived; and
transmitting a separate indication of the selected basis function.

14. The program of claim 12, wherein the at least two basis functions comprise an inverse discrete Fourier transform and at least one of an inverse discrete cosine transform and an inverse discrete sine transform.

15. The program of claim 12, wherein the actions are executed once for each of a plurality of consecutive and equal adaptation intervals, said adaptation intervals comprising an integer multiple of one multi-carrier symbol.

16. The program of claim 12, wherein for at least one basis function, the performance measure comprises an error rate, and selecting one of the at least two basis functions comprises selecting that basis function that minimizes the error rate.

17. The program of claim 12, wherein the performance measure comprises a signal to noise ratio SNR, where $$SNR_n = \frac{P_n |H_n|^2}{N_o}$$

for an nth sub-carrier, $P_n$ represents the transmitted symbol power for the nth sub-carrier, $H_n$ represents the frequency function for the nth sub-carrier for the associated basis function, and $N_o$ represents average noise power respectively.

18. The program of claim 12, wherein the performance measure comprises a data rate and selecting one of the at least two basis functions comprises selecting a basis function that maximizes the data rate within an error constraint.

19. The program of claim 12, wherein the performance measure comprises a data throughput rate and selecting one of the at least two basis functions comprises selecting a basis function that maximizes the data throughput rate.

20. The program of claim 19, wherein selecting one of the at least two basis functions comprises selecting a basis function that maximizes the data throughput rate within an error constraint.

21. The program of claim 12, the actions further comprising at least one of:
adaptively modulating the signal to be transmitted; adaptively coding the signal to be transmitted, adaptively bit loading the signal to be transmitted, and adaptively power loading sub-carriers on which the signal is to be transmitted.

22. A transmitter comprising:
an input adapted to receive an input frequency domain signal from a source;
a modulator for adaptively converting the frequency domain signal to the time domain by one of at least two basis functions according to a command signal; and
a processor coupled to the modulator adapted to select from a channel feedback one of the at least two basis functions, and adapted to provide the command signal to the modulator directing which basis function by which to convert.

23. The transmitter of claim 22, wherein the processor is adapted to select one of the at least two basis functions by predicting performance, over a channel represented by the channel feedback, of the signal as converted by each of the at least two basis functions.

24. The transmitter of claim 22, wherein the processor is adapted to select one of the at least two basis functions by predicting for each basis function one of an error rate and a signal to noise ratio.

25. The transmitter of claim 22, wherein the processor is adapted to select one of the at least two basis functions by predicting for each basis function a data rate within an error constraint.

26. The transmitter of claim 22, wherein the processor is adapted to select one of the at least two basis functions by predicting for each basis function a throughput data rate.

27. The transmitter of claim 26, wherein predicting for each basis function a throughput data rate comprises a throughput data rate within an error constraint.

28. The transmitter of claim 22, wherein the processor is adapted to select one of the at least two basis functions once during each of a plurality of consecutive and equal adaptation intervals, each adaptation interval being an integer multiple of one multi-carrier symbol.

29. The transmitter of claim 22, wherein the at least two basis functions comprise an inverse discrete Fourier transform and at least one of an inverse discrete cosine transform and an inverse discrete sine transform.

30. The transmitter of claim 22 wherein the processor is configured to determine adaptive modulation of the signal from the source; to adaptively code the signal from the source, to adaptively bit load the signal from the source, and to adaptively power load sub-carriers on which the signal from the source is to be transmitted.

31. A modulator comprising:
a first input adapted to receive a frequency domain signal from a source, and a second input coupled to an output of a processor;
a modulation sub-block adapted to apply a modulation to the frequency domain signal input at the first input, wherein the modulation sub-block is further adapted to apply a selected one of at least two modulations to the frequency domain signal, said selected one of at least two modulations selected according to a modulation command signal received over a modulation command input coupled to the processor;
a basis function sub-block having an input coupled to the modulation sub-block adapted to convert the modulated frequency domain signal to the time domain according to one of at least two basis functions that is selected according to a command signal received over a command input coupled to the processor; and
an output for coupling the basis function sub-block to a transmit antenna.

32. A modulator comprising:
a first input adapted to receive a frequency domain signal from a source, and a second input coupled to an output of a processor;
a modulation sub-block adapted to apply a modulation to the frequency domain signal input at the first input;
a basis function sub-block having an input coupled to the modulation sub-block adapted to convert the modulated frequency domain signal to a time-domain signal according to one of at least two basis functions that is selected according to a command signal received over a command input coupled to the processor;
an encoder sub-block adapted to apply a selected one of at least two coding rates to the time-domain signal, said selected one of at least two coding rates selected according to a coding command signal received over a coding command input coupled to the processor; and
an output for coupling the basis function sub-block to a transmit antenna.

33. A modulator comprising:
a first input adapted to receive a frequency domain signal from a source, and a second input coupled to an output of a processor;
a modulation sub-block adapted to apply a modulation to the frequency domain signal input at the first input;
a basis function sub-block having an input coupled to the modulation sub-block adapted to convert the modulated frequency domain signal to the time domain according to one of at least two basis functions that is selected according to a command signal received over a command input coupled to the processor, wherein the basis function sub-block is further adapted to apply at least one of adaptive bit and power loading of the modulated signal onto subcarriers according to a bit/power command input coupled to the processor; and an output for coupling the basis function sub-block to a transmit antenna.

34. A receiver comprising:

an input for coupling to at least one receive antenna for receiving a signal that includes a time-domain symbol;

a demodulator coupled to the input and configured to adaptively convert the received time domain symbol to the frequency domain by a selected one of at least two basis functions, wherein the one of at least two basis functions is selected in response to at least one channel condition over at least one symbol interval of the received time domain symbol of the signal, wherein the receiver operates on the at least one channel.

35. The receiver of claim 34, wherein the at least two basis functions comprise a Fourier function and at least one of a Cosine and a Sine function.

36. The receiver of claim 34, wherein the the at least one channel condition comprises a channel quality measured by the receiver over which the signal was received.

37. A modulator comprising:

a first input adapted to receive a frequency domain signal from a source, and a second input coupled to an output of a processor;

a modulation sub-block adapted to apply a modulation to the frequency domain signal input at the first input;

a basis function sub-block having an input coupled to the modulation sub-block adapted to convert the modulated frequency domain signal to the time domain according to one of at least two basis functions that is selected according to a command signal received over a command input coupled to the processor, the command signal being responsive to at least one channel condition over at least one symbol interval of a symbol of the frequency domain signal, wherein the modulator operates on the at least one channel; and an output for coupling the basis function sub-block to a transmit antenna.

38. The modulator of claim 37, wherein the modulation sub-block is further adapted to apply a selected one of at least two modulations to the frequency domain signal, said selected one of at least two modulations selected according to a modulation command signal received over a modulation command input coupled to the processor.

39. The modulator of claim 37, further comprising an encoder sub-block adapted to apply a selected one of at least two coding rates to the time-domain signal, said selected one of at least two coding rates selected according to a coding command signal received over a coding command input coupled to the processor.

40. The modulator of claim 37, wherein the basis function sub-block is further adapted to apply at least one of adaptive bit and power loading of the modulated signal onto subcarriers according to a bit/power command input coupled to the processor.

* * * * *

UNITED STATES PATENT AND TRADEMARK OFFICE
CERTIFICATE OF CORRECTION

PATENT NO. : 7,620,112 B2 Page 1 of 1
APPLICATION NO. : 11/291232
DATED : November 17, 2009
INVENTOR(S) : Clive K. Tang and Giridhar D. Mandyam It is certified that error appears in the above-identified patent and that said Letters Patent is hereby corrected as shown below:

IN THE CLAIMS:

In Claim 7: Column 16, line 16, delete "where, and".

Signed and Sealed this

Twelfth Day of January, 2010

David J. Kappos
*Director of the United States Patent and Trademark Office*